May 9, 1939.  F. D. BRADDON  2,158,048
CONSTANT PERIOD GYROCOMPASS
Filed May 1, 1937   2 Sheets-Sheet 1

INVENTOR
FREDERICK D. BRADDON
BY Herbert H. Thompson
HIS ATTORNEY.

May 9, 1939.     F. D. BRADDON     2,158,048
CONSTANT PERIOD GYROCOMPASS
Filed May 1, 1937     2 Sheets-Sheet 2
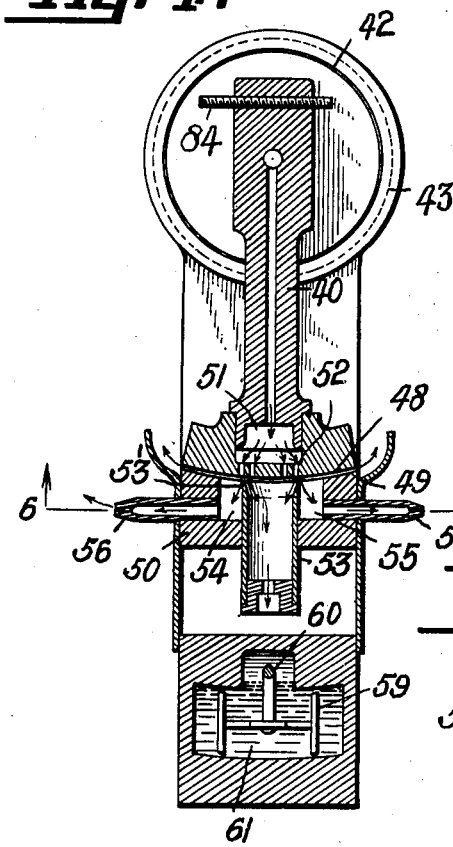
Fig. 4.
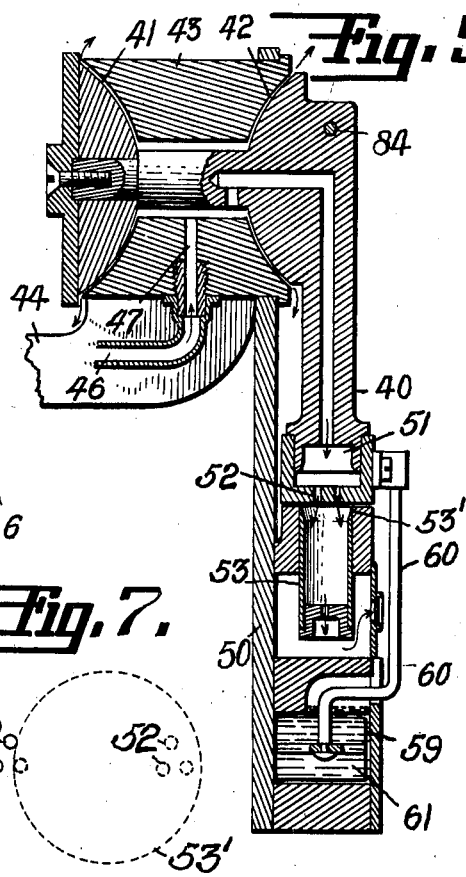
Fig. 5.
Fig. 7.
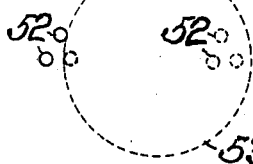
Fig. 6.
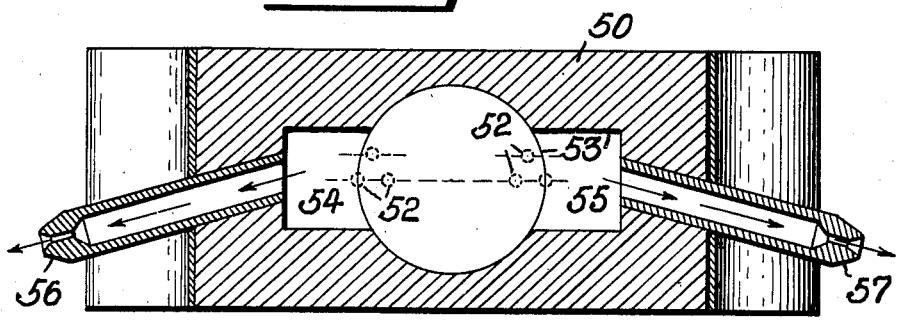
INVENTOR
FREDERICK D. BRADDON
BY
Herbert H. Thompson
HIS ATTORNEY.

Patented May 9, 1939

2,158,048

UNITED STATES PATENT OFFICE 2,158,048

CONSTANT PERIOD GYROCOMPASS

Frederick D. Braddon, Babylon, N. Y., assignor to Sperry Gyroscope Company, Inc., Brooklyn, N. Y., a corporation of New York Application May 1, 1937, Serial No. 140,088

15 Claims. (Cl. 33—226)

This invention relates to gyroscopic compasses, especially the air-borne or air-floated type in which a follow-up system is unnecessary. It is recognized in the art that, for very accurate use, the period of the compass should be kept substantially constant regardless of changes in latitude, for reasons explained in the prior patent to H. H. Thompson and E. C. Sparling No. 1,886,606 dated November 8, 1932, for Constant period gyro-compass. The preferred method of accomplishing this purpose is by altering the gravitational factor. Preferably also the damping factor should be altered proportionally at the same time so that the relation between the gravitational and the damping factors remains the same. With the air-borne type of compass, however, it is a difficult matter to vary the gravitational factor, since it is necessarily mounted on or forms a part of the sensitive element, and it is, of course, very important not to disturb the sensitive element in any manner while the compass is running.

One of the objects of my invention is to provide a simple method of altering the gravitational and damping factors with latitude without disturbing the sensitive element and without affecting the air supply to the air bearings and rotor spinning means. Another object of this invention is to provide a simple means to eliminate the damping during the turning of the ship without disturbing the sensitive element. A further improvement consists in refinements of an air operated damper.

Referring to the drawings showing a preferred form of my invention:

Fig. 4 is a vertical section through the pendulous damping means.

Fig. 5 is a vertical section through the same at right angles to Fig. 4.

Fig. 6 is a transverse section taken approximately on line 6—6 of Fig. 4, looking in the direction of the arrows.

Fig. 7 is a diagram showing the relative positions of the cut-off circular knife edge and apertures in the damper upon relative inclination in one direction.

Figure 1:
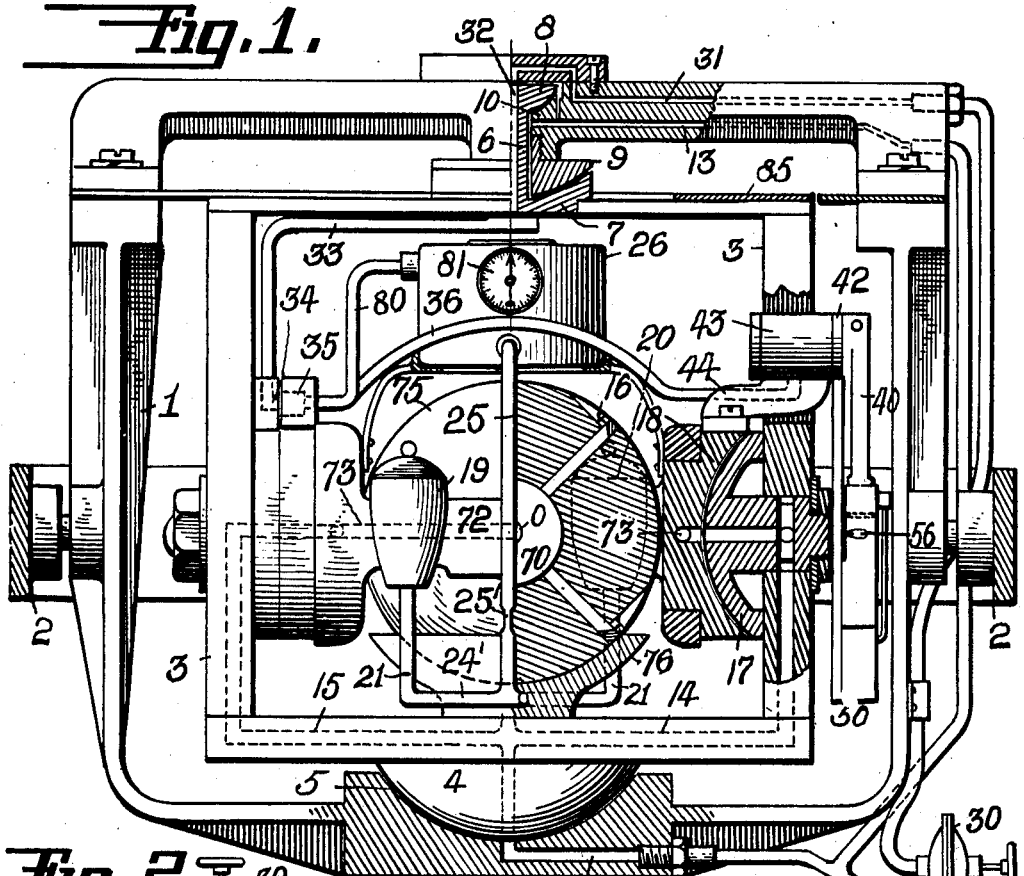
Fig. 1 is a south elevation, partly in section, of my invention as applied to an air-borne, air-spun gyrocompass.

As stated, the gyro-compass illustrated is of the air-borne, air-spun type. As shown, the main frame or the binnacle 1 is universally supported within gimbal 2. Within said binnacle is journaled vertical ring 3 for turning about a vertical axis on which is the compass card 85. Preferably air flotation bearings are provided for this purpose, the lower bearing being shown as composed of a large button or spherical portion 4 on the bottom of the ring 3 which rests in a spherical cup 5 in binnacle 1. At the top, I show a guiding stem 6 secured to the vertical ring having a lower annular cup-like portion 7, and an upper annular button-like convex portion 8 cooperating with corresponding convex and concave members 9 and 10 secured to the binnacle. The air is shown supplied to both the upper and lower bearings from a supply pipe 11 connected with a pump not shown and connected with the passageway 12 in the lower bearing and to passageway 13 in the upper portion of the binnacle, from whence the air passes through upper and lower bearings respectively. As explained in a prior application of Leslie F. Carter, now Patent #2,142,018, dated December 27, 1938, for Gyrocompass, a portion of the air in passage 12 is led through passageways 14 and 15 in the vertical ring to the horizontal trunnions which support the rotor bearing ring in the vertical ring. The horizontal trunnions are likewise shown as air-borne, being composed of buttons 17 on the vertical ring and corresponding cups 18 on the rotor bearing frame 72. Some of the air enters passages 73 in said frame, whence it passes to the air flow rotor bearings 70, a further portion of the air entering the middle of the ball at 0, whence it is ejected through tangential spinning jets 16 for spinning the rotor 75 shown in the form of a sphere or ball universally floated by an air film in cup 76 on ring 3.

For imparting meridian-seeking properties to the compass, I have shown a plurality of pairs of liquid containers 19, 19', and 20, the members of each pair being spaced in a North-South direction on the rotor bearing ring and connected by small bore pipes 21. For the purpose of varying the gravitational factor to maintain the period constant for different latitudes, I employ the known principle that the effectiveness of a liquid transfer gravitational control varies with the free or exposed surface area of the liquid in the spaced containers. To this end, the containers are shown as tapered toward the bottom as at 22, and means are provided for varying the mean liquid level in both containers so that the effective area of the liquid therein may be varied with the latitude. The mean depth of the liquid in the containers is shown as controlled from a central pressure head member 23. This is preferably situated centrally on the ring 72 and may be in the form of a flexible container closed at its top and preferably filled with liquid, the interior of which is connected at its bottom to pipes 25, preferably having restrictions 25' therein. Pipes 24 are shown as connected to both pairs of containers 19 and 20 through crosspipes 24', lying in front and back of bearing 4.

Figure 2:
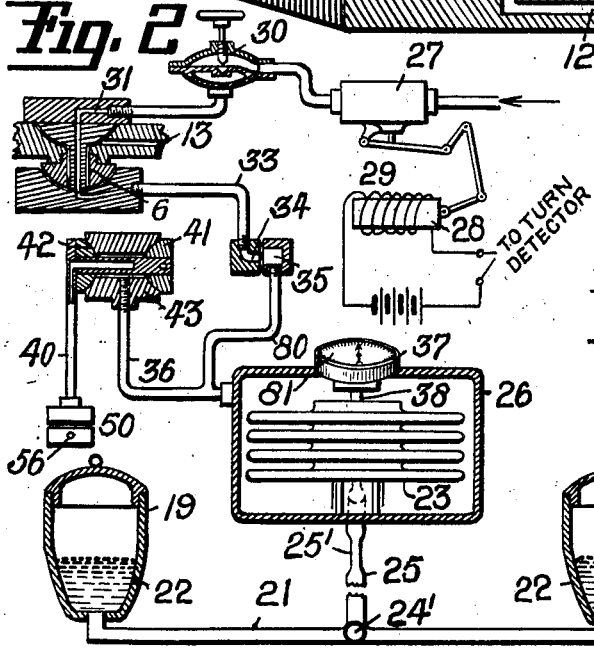
Fig. 2 is a diagrammatic view, showing the separate path of the air supply for varying the gravitational factor and for effecting the damping.
Figure 3:
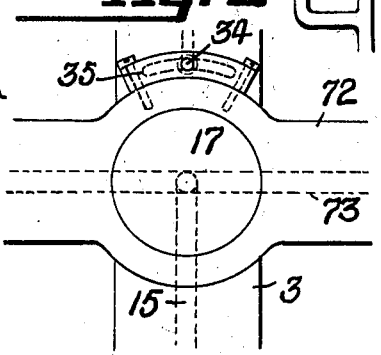
Fig. 3 is a detailed side elevation, showing one of the bearings of the rotor bearing ring in the vertical ring of the compass.

Said container 23 is enclosed within an airtight box 26 which is connected to the air supply through passageways preferably separate from the passageways which supply air to the airborne bearings and rotor spinning means. As shown, the air supply to box 26 first passes through a damping eliminator or shut-off valve 27 which is normally open but which is closed temporarily when the ship turns or changes speed. For this purpose, the valve is represented as operated from the movable core 28 of solenoid 29, which is controlled from a switch operated from a turn or acceleration detector, such as shown in prior patent of Leslie F. Carter, No. 1,730,967, October 8, 1929, for Turn error preventor for gyrocompasses. The air thence passes to an adjustable throttle valve 30 which is adjusted to vary the air pressure beyond the valve in accordance with latitude. From thence the air passes through passage 31 (see Fig. 1) in the binnacle and thence down through an axial opening 32 in the stem 6, whence the air passes through pipe 33 to a port 34, where it passes into an elongated receiving port 35 on the rotor bearing frame. Thence the air is led into said container 26 through pipe 80. A portion of this air may also be led to the damper through the branch pipe 36. Preferably I mount on the container 26 a gauge 37 having a foot 38 resting on top of the bellows 23 so as to show the position of the top of the bellows which, of course, varies with the air pressure in chamber 26. The dial 81 on gauge 37 may be graduated in degrees of latitude as indicated in Fig. 1 so that, in operation, throttle valve 30 is adjusted until gauge 37 reads the latitude in which the instrument is situated at the time. In Fig. 1, the dial is represented as facing forwardly instead of upwardly as in Fig. 2.

The damper is shown in the form of an airborne pendulum 40 supported by air bearings 41 and 42 in a sleeve 43 secured to a bracket 44 extending from the rotor bearing frame, 72. Set screw 84 is for balancing purposes. These bearings may likewise be of the spherical type, as shown in Fig. 5, and air is supplied to the same from a passageway 46 within the bracket connected to pipe 36. A portion of the air passes through passageway 47 and out through the spherical bearings, another portion of the air passing laterally and downwardly through passageway 47 in the pendulum. The pendulum is shown as having a curved bottom 48 closely fitting but not touching curved top 49 on a member 50 rigidly secured to sleeve 43 and bracket 44 and therefore stabilized from the rotor bearing frame. The air from passage 47 normally emerges into chamber 51 and thence passes downwardly and outwardly through a plurality of apertures 52 symmetrically situated with respect to the center line of the pendulum. A very small portion of the air emerging from said apertures passes laterally between the curved surfaces 48 and 49 keeping them spaced. The major portion, however, passes downwardly, and is divided by the sharpened circular top or knife edge 53' of sleeve 53. In the balanced or normal position of the pendulum, the knife edge preferably directs the major portion of the escaping air downwardly within sleeve 53, i. e., in a neutral direction, that is, so as not to exert a torque on the gyroscope about any of its pivotal axes. This may be accomplished by making the apertures 52 in the form of a plurality of separate holes, so positioned that knife edge 53' bisects the outer apertures with all of the inner apertures within the sleeve. Therefore, in this position, a comparatively small amount of air escapes into the outer chambers 54 and 55, and thence passes outwardly and laterally through damping nozzles 56 and 57. Since the amount of air so escaping is equal in both directions, no torque is exerted on the compass about its vertical axis. In case, however, a relative inclination of the pendulum and gyroscope occurs, a lateral displacement takes place, resulting in the uncovering of a greater area of aperture on one side than on the other (as shown in Fig. 7), resulting in a torque about the vertical axis substantially proportional to tilt. The nozzles 57 and 56 are shown inclined forwardly in Fig. 6 so that the air emerging therefrom will be directed away from near parts not to disturb the same. Preferably the pendulum 40 is highly damped as by means of a piston or vane 59 secured thereto through rod 60, which vanes are immersed in oil 61 within the lower part of the member.

In my invention, therefore, it will be seen that I provide a simple means for simultaneously varying both the gravitational factor and the damping factor of an air-borne compass without disturbing the sensitive element and without affecting the air supply to the air bearings or rotor, and also eliminate the damping in a simple and effective manner. The mean liquid level in the two pairs of containers 19—20 is not materially affected by the temporary closing of valve 27 since restrictions 25' are placed in pipes 25 to retard the flow of mercury or other liquid therethrough for the limited periods of turn of the ship. Cutting off of the air supply to bearings 41 and 42 at that time is immaterial, since the damping jets are also inoperative.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus, it is obvious that the form of pendulum control herein shown is applicable to other analogous forms of gyroscopes, such as directional gyroscopes, in which the device would operate in the same manner to erect the gyroscope, the only difference being that the pendulum controller is the sole erecting device in a directional gyroscope, while in the gyro-compass it is a secondary erecting device operating to damp out primary oscillations of the compass.

The taper of the container walls 22 may also be varied, but the preferred shape is curved or conoidal, the curves being laid out so that, with any latitude adjustment, the combined free surface of the mercury or oil in both pots is a constant for all tilts the compass is likely to assume in operation.

What is claimed is:

1. In a constant period gyro-compass, liquid transfer means for imparting gravitational control thereto, including a pair of spaced containers of tapered interior cross section and a restricted connection therebetween, a separate sealed container connected to said pair of containers, and means for varying the effective head on the liquid within said separate container, whereby the mean level of the liquid in said pair of containers and consequently the mean effective exposed area of the liquid therein may be varied for different latitudes.

2. In an air borne gyro-compass, the combination with the air bearings, a source of differential air pressure, air pressure means for controlling the gravitational factor, separate air passageways connecting said source with said bearings and with said pressure means, and means in the latter passage for varying the effective air pressure with latitude.

3. In an air spun gyro-compass, the combination with the air jet spinning means, a source of differential air pressure, air pressure means for controlling the gravitational factor, separate air passageways connecting said source with said jet means and with said pressure means, and means in the latter passageway for varying the effective air pressure with latitude.

4. In a gyro-compass having an air spinning means for the rotor and air pressure controlled meridian seeking torque means, means for maintaining the period of said compass substantially constant for different latitudes, including means for adjusting the air pressure supplied to said torque means only.

5. In a gyro-compass having an air spinning means for the rotor, air pressure controlled meridian seeking torque applying means and a common means for supplying differential air pressure to both said means, means for maintaining the period of said compass substantially constant for different latitudes, including means for adjusting the air pressure supplied to said torque means in accordance with latitude without affecting said spinning means.

6. In a gyro-compass having air flow bearings about its vertical and horizontal axes, air pressure controlled meridian seeking torque applying means and a common means for supplying differential air pressure to both said means and bearings, means for maintaining the period of said compass substantially constant for different latitudes, including means for adjusting the air pressure supplied by said torque means in accordance with latitude without affecting the air supply to said bearings.

7. A damping device for gyroscopic compasses and the like, comprising a pendulum, air flow bearings pivotally suspending said pendulum from the compass, means for supplying air under pressure thereto, said pendulum having an axial channel connected with the interior of said bearings and downwardly directed ports, and shutter means on the compass for dividing the air issuing from said ports and directing portions thereof laterally and oppositely and other portions downwardly, the proportional amount of air issuing in each direction laterally being varied in accordance with the respective direction and amount of relative tilt of the compass and pendulum.

8. A damping device for gyroscopic compasses and the like, comprising a pendulum, bearings pivotally suspending said pendulum from the compass, means for supplying air under pressure thereto, said pendulum having an axial channel connected with the interior of said bearings and spaced ports, and a hollow shutter on the compass for dividing the air issuing from said ports and directing the major portion thereof normally in a neutral direction, and the remainder in two opposite lateral jets which exert normally equal and opposite torques about the vertical axis of the compass, but upon relative tilt of said pendulum and gyroscope, the amount of air issuing laterally from one jet is increased and the air issuing from the opposite jet decreased, thereby exerting an unbalanced damping torque on the compass.

9. In an air borne air damped gyro-compass having a variable gravitational factor, the combination with the air bearings, air jet damping means and gravitational factor, a source of differential air pressure, air pressure means for varying the gravitational factor, and means for temporarily shutting off the air supply to said damper to eliminate the damping, without materially altering the gravitational factor.

10. In a liquid-controlled gyro-compass, means for varying the gravitational factor comprising spaced containers for the liquid having a tapered interior fixed wall, and means exterior of said containers for varying the mean level of the liquid therein to alter the free surface thereof without disturbing the gyrocompass.

11. In a liquid controlled gyro-compass, a pair of connected liquid containers spaced N—S on the compass, said containers being so designed that the area of the free surface of the liquid therein varies with liquid level therein, a third central container connected to both the other two, and means for varying the head on the liquid in the latter to alter the mean effective liquid level in the first mentioned containers.

12. In a liquid controlled gyro-compass, a pair of connected liquid containers spaced N—S on the compass, said containers being so designed that the area of the free surface of the liquid therein varies with liquid level therein, a variable air pressure means for varying the liquid level in said containers to keep the period constant, and an air operated damping means for the compass supplied from said variable pressure means, whereby the damper is varied with the gravitational factor.

13. A pendulous controlling device for gyroscopes comprising a hollow pendulum, means for leading air into the same through its pivotal support, there being ports in said pendulum, through which air is discharged in a neutral direction therefrom, and shutter means on the gyroscope intercepting and differentially dividing the air stream from said ports and directing variable portions thereof in opposite directions laterally in accordance with tilt, to exert an erecting torque on the gyroscope.

14. A constant period liquid controlled gyro-compass as claimed in claim 10, wherein the taper of the interior of said containers is curved in such manner that the combined free liquid surface remains a constant for all normal tilts.

15. In a gyrocompass having a liquid gravitational factor and air jet damping, the combination with a pair of spaced, connected liquid containers and a pendulum controlled air jet damping means, a flexible container also connected to said other containers, and enclosed in an outer container so as to be subject to the air pressure in the latter, whereby the mean liquid level in said pair of containers may be altered, a common source of air pressure for said air jet damper and said last named container, and means for temporarily disconnecting said source to eliminate damping without materially altering the mean level of liquid in said pair of containers.

FREDERICK D. BRADDON.